United States Patent [19]

Vogl et al.

[11] Patent Number: 5,108,315
[45] Date of Patent: Apr. 28, 1992

[54] PAY TELEPHONE STATION REPAIR TECHNICIAN'S ADAPTER

[75] Inventors: Allen W. Vogl, Melbourne; Douglas J. Buron, Micco, both of Fla.

[73] Assignee: International Teleservice Corporation, Melbourne, Fla.

[21] Appl. No.: 688,269

[22] Filed: Apr. 22, 1991

[51] Int. Cl.[5] .......................................... H01R 25/00
[52] U.S. Cl. ................................... 439/651; 439/639
[58] Field of Search .............................. 439/638-640, 439/651-655, 676, 344

[56] References Cited

U.S. PATENT DOCUMENTS

| 1,942,063 | 1/1934 | Kinnard | 439/483 |
| 4,362,905 | 12/1982 | Ismail | 439/639 |
| 4,648,682 | 3/1987 | Tubbs | 439/638 |
| 4,738,635 | 4/1988 | Harrington et al. | 439/676 |
| 4,925,393 | 5/1990 | Ingalsbe | 439/638 |
| 4,968,260 | 11/1990 | Ingalsbe | 439/638 |

OTHER PUBLICATIONS

"Corsets", Miller, Jun. 1968.

Primary Examiner—David L. Pirlot
Attorney, Agent, or Firm—Evenson, Wands Edwards, Lenahan & McKeown

[57] ABSTRACT

An adapter permits a telephone repair technician to attach his data communications equipment to a C-set or D-set pay telephone station without alligator clips by a direct connection with the RJ11 connectors of a data terminal or the like. The adapter can be in the form of a housing having different corner radii and two jacks, one of which is wired in the C-set mode and the other of which is wired in the D-set mode, or one jack and a switch for achieving the C- and D-set modes. The adapter has pins arranged to plug into a standard 11-pin connector in the telephone station lower housing.

20 Claims, 6 Drawing Sheets

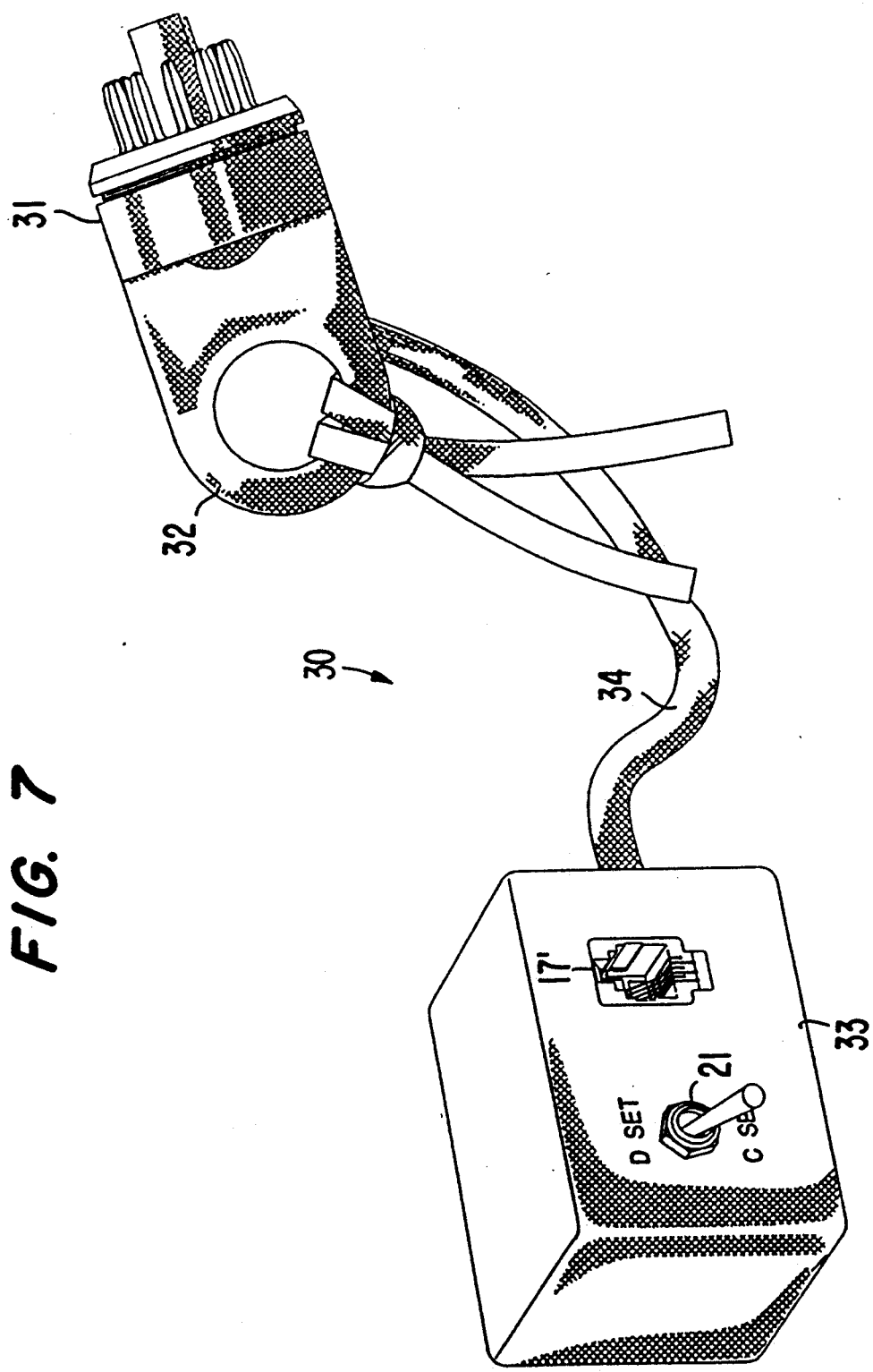

PAY TELEPHONE STATION REPAIR TECHNICIAN'S ADAPTER

BACKGROUND AND SUMMARY OF THE INVENTION

The present invention relates to an adapter for pay telephone stations and, more particularly, to an adapter which permits a repair technician's data terminal or other data communications or telephone equipment to be easily connected to a C-set or D-set in a simple yet effective manner.

In the past, repair technicians using test sets have had to use alligator clips to connect to screw or other terminals in telephone pay stations in order to make electrical connections. Some modern pay station designs do not permit such connections, however, in an easy manner because of the absence of terminals or of the terminal types used.

It is an object of the present invention to provide an adapter which will permit the easy yet effective connection of a repair technician's data terminal and similar data communications equipment to the pay station.

It is yet another object of the present invention to provide an adapter which permits the connection of a test set to a C-set or D-set.

It is a further object of the present invention to configure an adapter so as to be able to negotiate unique and separate obstacles within the pay station housing of C and D type telephones.

The foregoing objects have been achieved in accordance with one embodiment of the present invention by providing an adapter in the form of a housing having a cross-section defined by different radii and provided with pins for connection to an 11-pin connector such as a socket in a C-set or a D-set configuration. The housing is also provided with a handle for allowing a finger to pass through an aperture in the handle to insert or remove the adapter into the 11-pin connector in the set. A label on the housing provides appropriate polarization by indicating to the repair technician which jack to use for inserting the modular cord/connector plug for either a C-set or a D-set.

It is an additional object of another embodiment of the present invention to provide an adaptor unit comprised of a single jack with a C/D configuration selector.

Yet another object of the present invention is to utilize a two-part adapter in which an 11-pin connector is attached via an electrical cable with RJ11 jacks.

BRIEF DESCRIPTION OF THE DRAWINGS

These and other features, objects and advantages of the present invention will become more apparent from the following detailed description of presently preferred embodiments of the present invention when taken in conjunction with the accompanying drawings wherein:

FIG. 7 is a perspective view of yet another embodiment of the adapter in accordance with the present invention in which an 11-pin connector is connected with a housing having one jack and switch or two jacks.

DETAILED DESCRIPTION OF THE DRAWINGS

Figure 1:
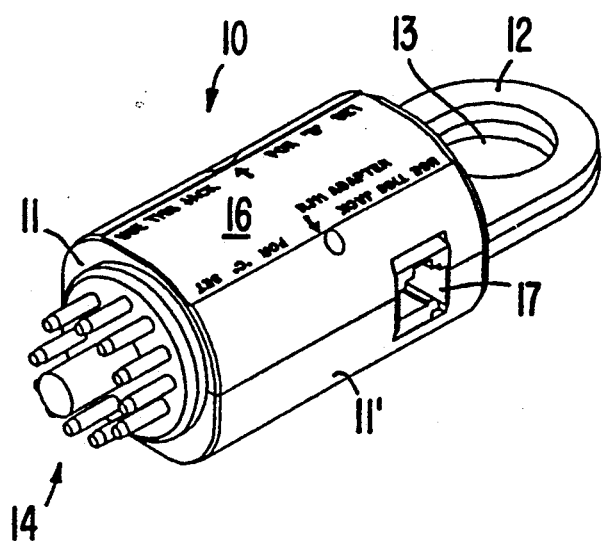
FIG. 1 is a perspective view of the adapter in accordance with the present invention.

The adapter in accordance with one embodiment of the present invention is designated in FIG. 1 generally by the numeral 10 and includes a two-part housing 11, 11', protruding handle 12 with a finger hole 13 so that the adapter 10 can be easily gripped by one of the technician's fingers and inserted into and removed from the housing of a pay station in a manner hereinafter described with reference to FIG. 4. The adapter 10 also includes standard pins designated generally by the numeral 14 at the end opposite to the handle 12 arranged to mate with the pins of a standard 11-pin connector 15 in a C-set or a D-set configuration as shown in the electrical schematic in FIG. 5.

The adapter 10 also includes a label 16 which points to two different jacks 17, 18 on diametrically opposite sides of the adapter housing and appropriately connected electrically with the pins 14 so that the RJ-11 (designated by numeral 19 in FIG. 4) plug on a repair technician's data terminal (not shown) can be plugged into the appropriate jack on the adapter 10 for a C-set or a D-set. The two parts 11, 11' of the adapter housing can be held together by screws, pop rivets or the like after the jacks 17, 18 appropriately connected with the pins 14 are inserted between the housing parts 11, 11'.

Figure 3:
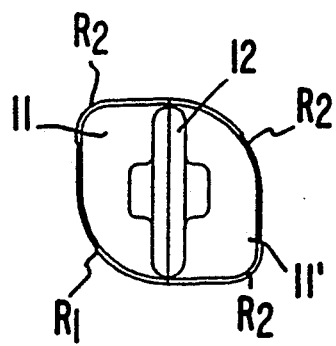
FIG. 3 is an end view of the adapter shown in FIGS. 1 and 2.
Figure 2:
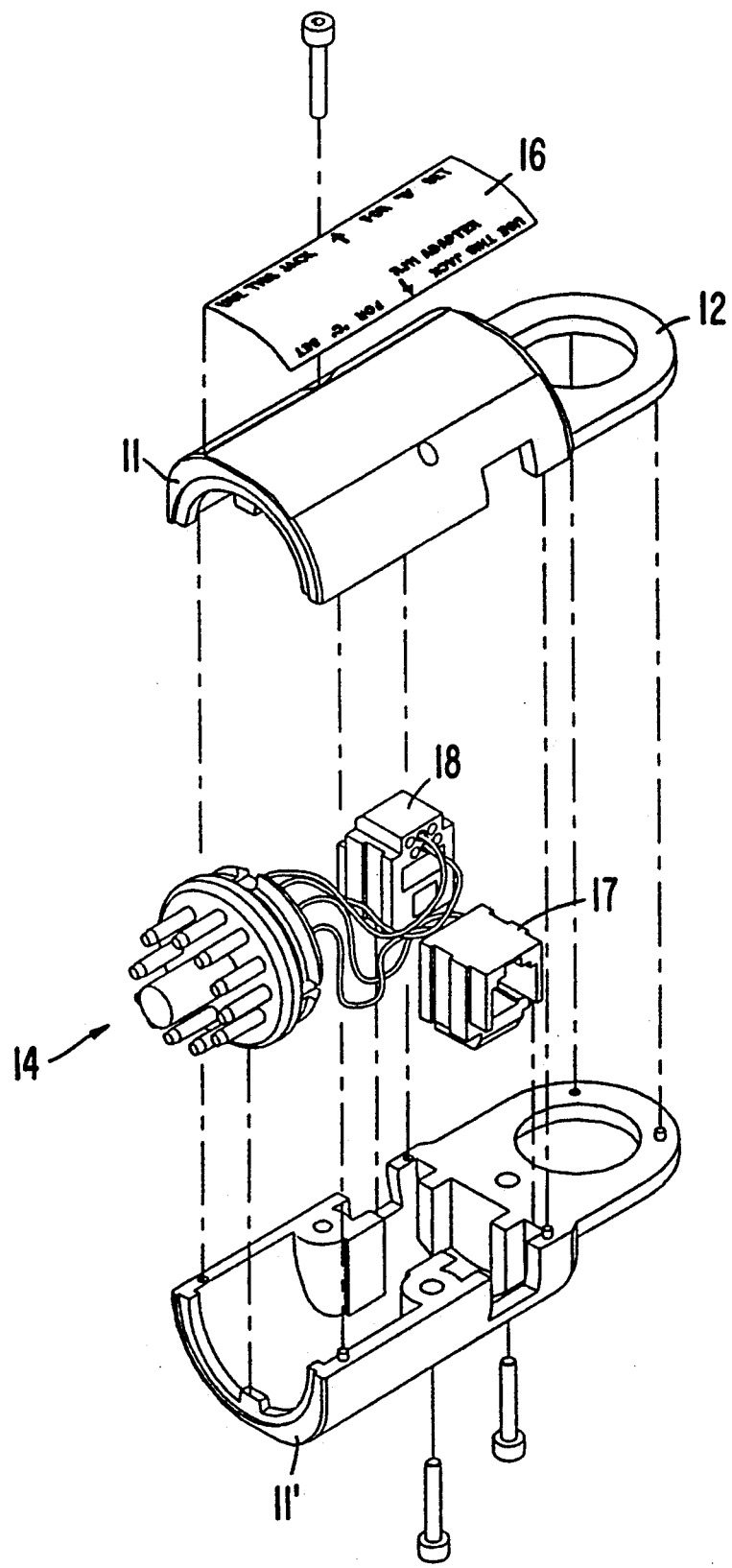
FIG. 2 is an exploded view of the parts of the adapter shown in FIG. 1.

The adapter housing is configured, as shown in the end view of FIG. 3, so as to have a relatively large radius R, on diametrically opposed sides of the housing. This configuration permits the adapter 10 to clear unique and separate obstacles in C- and D-type telephones.

Figure 4:
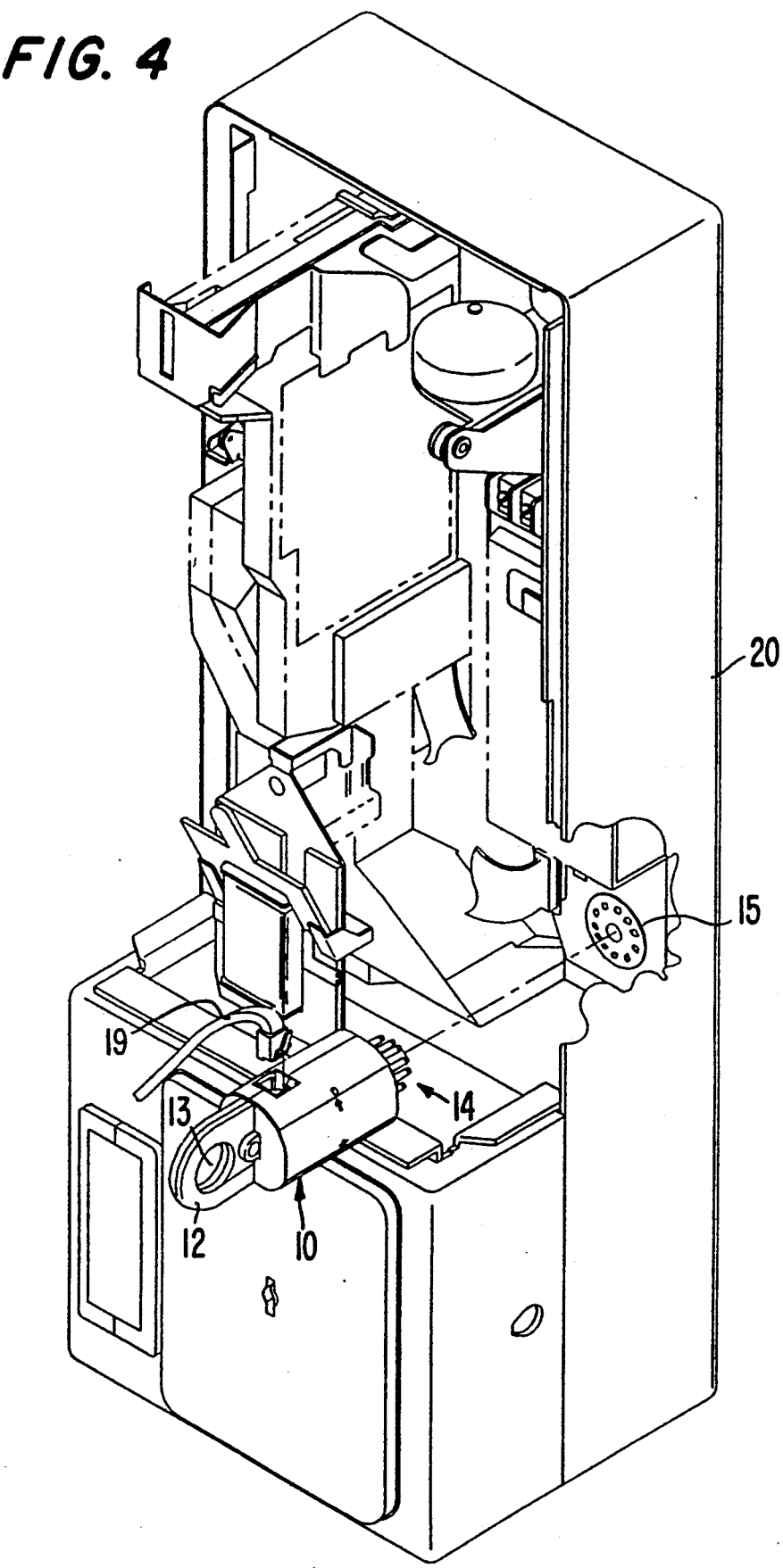
FIG. 4 is a perspective view of a pay station with the upper housing removed and the adapter in accordance with the present invention in position for insertion in the 11-pin connector in the upper housing.
Figure 5:
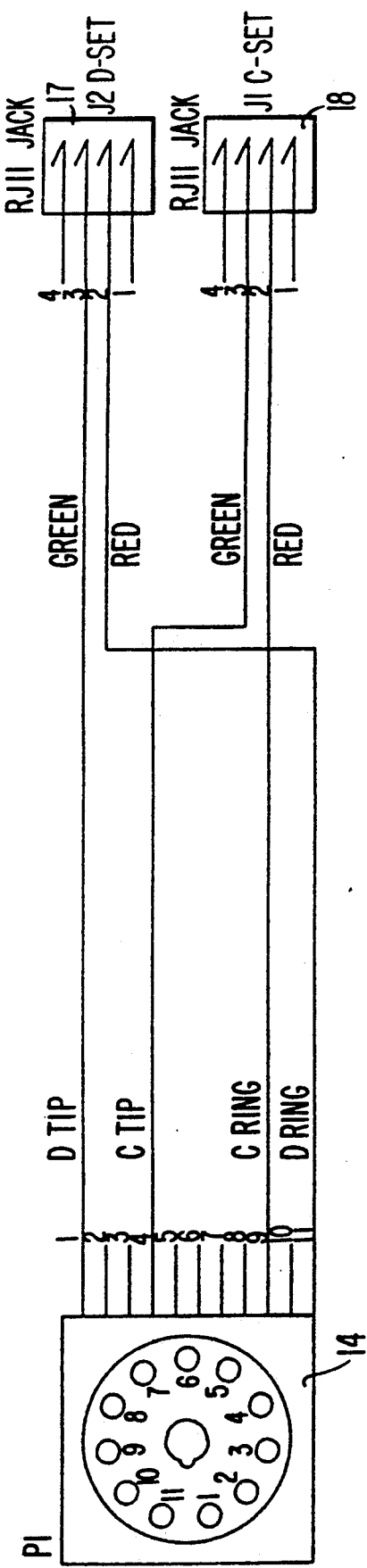
FIG. 5 is an electrical schematic of the adapter shown in FIGS. 1 and 2.

When the repair technician desires to communicate with the central office, he or she plugs the adapter 10 into the 11-pin connector 15 in the pay station lower housing 20 of a pay telephone as shown in FIG. 4. Depending upon whether the station is a C-set or a D-set configuration, the technician will plug the RJ-11 plug from the data terminal into one of the two jacks 17, 18 in the adapter 10 in order to provide the proper circuit connection.

Figure 6:
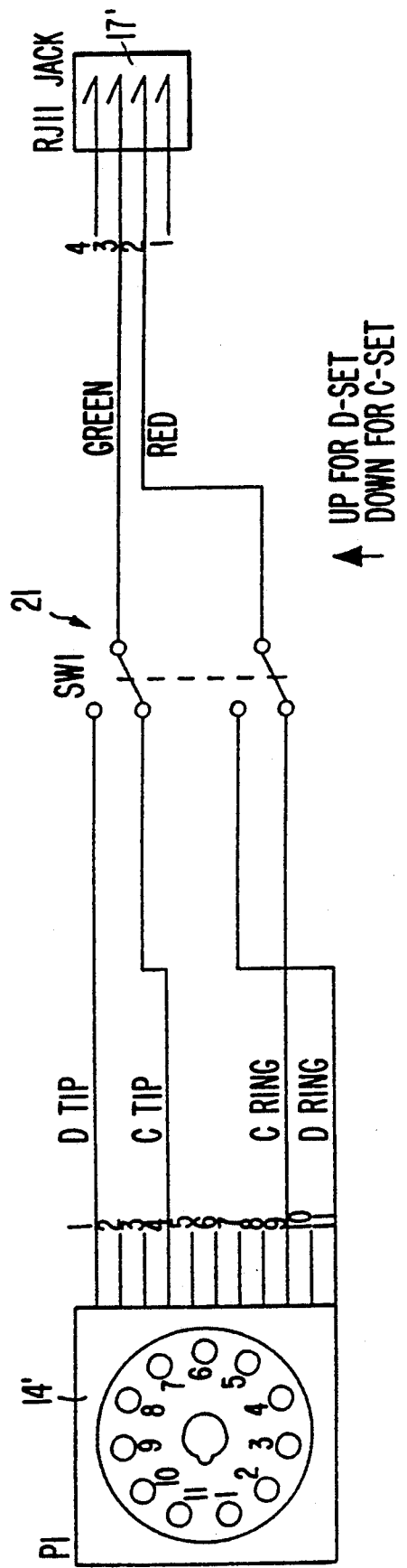
FIG. 6 is an electrical schematic of another embodiment of the adapter in which a single jack is used with a switch for making C and D connections.

Instead of two jacks 17, 18 in the adapter housing, the present invention contemplates, as shown in FIG. 6, the use of only one jack 17' connected to the standard pins 14' through a switch 21 which, in the illustrated version, is moved up for a D-set configuration and down for a C-set configuration.

Another embodiment of the present invention is shown in FIG. 7 in the form of a two-part adapter designated generally by the numeral 30 and having a much shorter 11-pin connector 31 with handle 32 connected to a separate housing 33 by an electrical cable 34. The housing 33 can be provided with two separate jacks 17, 18 (FIG. 5) for providing the C- and D-configurations or with a single jack 17' and switch 21 as shown in FIG. 6.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An adapter for temporarily connecting a repair technician's data terminal and other data communications or telephone equipment, to a telephone pay station, comprising a housing configured to be inserted temporarily inside the pay station, an 11-pin connector for electrically connecting the housing inside the pay station, and means for connecting at least one RJ11 connector to the housing in a C-set mode or a D-set mode and establishing communication between the equipment and a remote location via the pay station.

2. The adapter according to claim 1, wherein the housing is a multi-part housing.

3. The adapter according to claim 1, wherein a handle is arranged at the housing at an end opposite to another and at which the 11-pin connector is located, the housing has a peripheral configuration comprising two diametrically opposed corners having a first radius and two diametrically opposed corners having a second radius larger than the first radius, and the handle and connecting means being arranged with respect to the corners such that the handle and connecting means are disposed in a vertical plane between one of the corners having the first radius and the other of the corners having the second radius in the temporarily inserted position of the adapter in the pay station.

4. The adapter according to claim 1, wherein the housing has a handle adapted to be gripped by a finger of a repair technician.

5. The adapter according to claim 4, wherein the housing is a multi-part housing.

6. The adapter according to claim 1, wherein the housing includes means for directing a repair technician to obtain a C-set mode or a D-set mode.

7. The adapter according to claim 6, wherein the housing is a multi-part housing.

8. The adapter according to claim 7, wherein the housing has a handle adapted to be gripped by a finger of a repair technician.

9. The adapter according to claim 1, wherein the housing is configured along its periphery for avoiding obstacles in differently configured pay stations.

10. The adapter according to claim 9, wherein the housing has a handle at one end opposite to another end having the housing connecting means.

11. The adapter according to claim 9, wherein the housing peripheral configuration comprises two diametrically opposed corners having a first radius and two other diametrically opposed corners having a second radius larger than the first radius.

12. The adapter according to claim 9, wherein the RJ11 connector connecting means comprises jacks electrically connected to the housing connecting means such that one jack provides the C-set mode and another jack provides the D-set mode.

13. The adapter according to claim 1, wherein the RJ11 connector connecting means comprises at least one jack operatively associated with the housing connection means.

14. The adapter according to claim 13, wherein the housing is configured along its periphery for avoiding obstacles in differently configured pay stations.

15. The adapter according to claim 1, wherein the RJ11 connector connecting means comprises a jack arranged on the housing and a switch operatively connected between the jack and the housing connecting means for selectively providing the C-set mode and the D-set mode.

16. The adapter according to claim 15, wherein the housing is configured along its periphery for avoiding obstacles in differently configured pay stations.

17. The adapter according to claim 1, wherein the RJ11 connector connecting means comprises a second housing electrically connected to the first-mentioned housing and having at least one jack.

18. The adapter according to claim 17, wherein a switch is operatively arranged between a single jack in the second housing and the housing connecting means for selectively providing the C-set mode and the D-set mode.

19. The adapter according to claim 16, wherein the housing has a handle at one end opposite to another end having the housing connecting means.

20. The adapter according to claim 19, wherein the handle has an aperture sized to be gripped by a repair technician's finger for inserting and removing the adapter into and out of a pay station.

* * * * *